United States Patent Office 3,032,018
Patented May 1, 1962

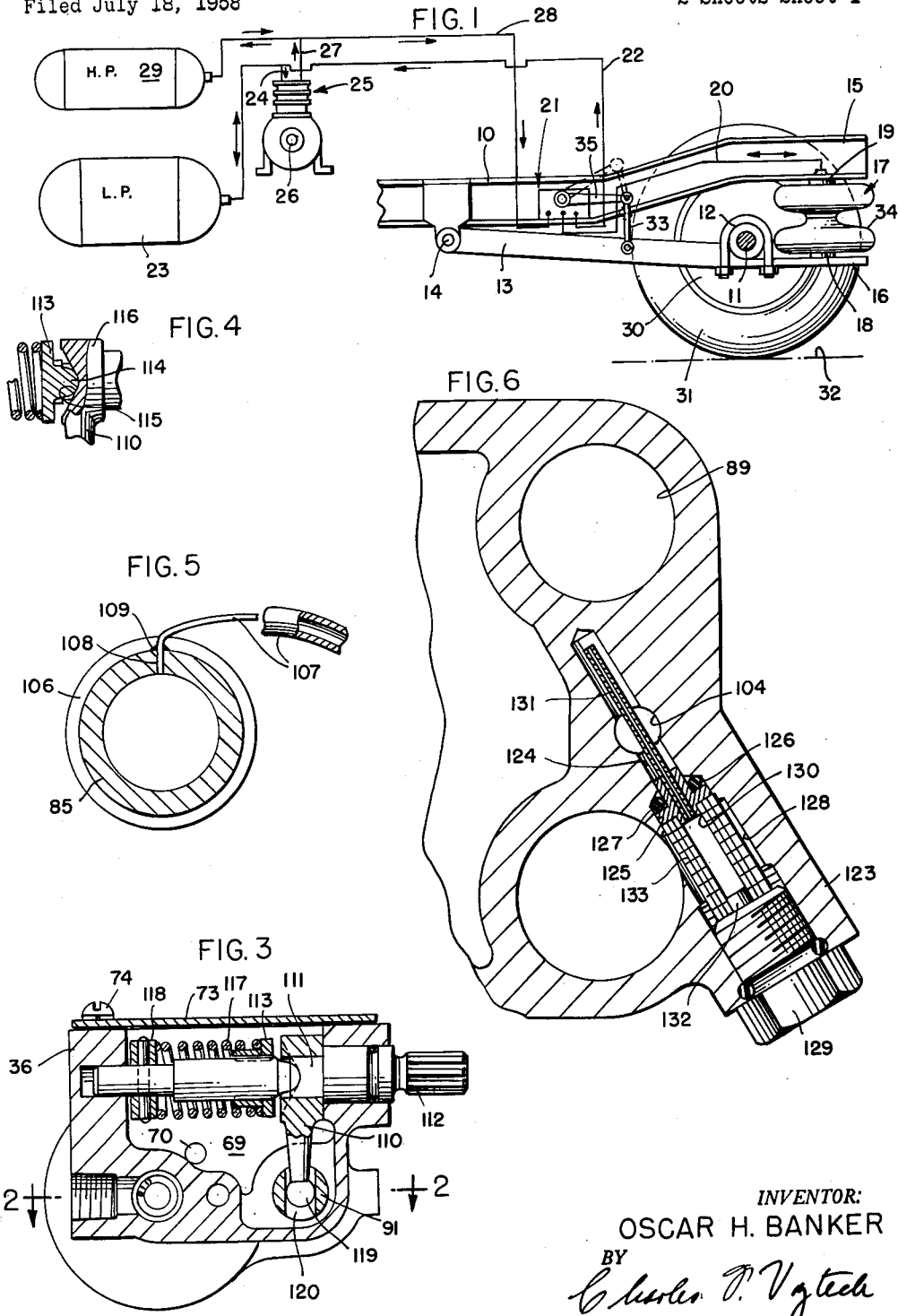

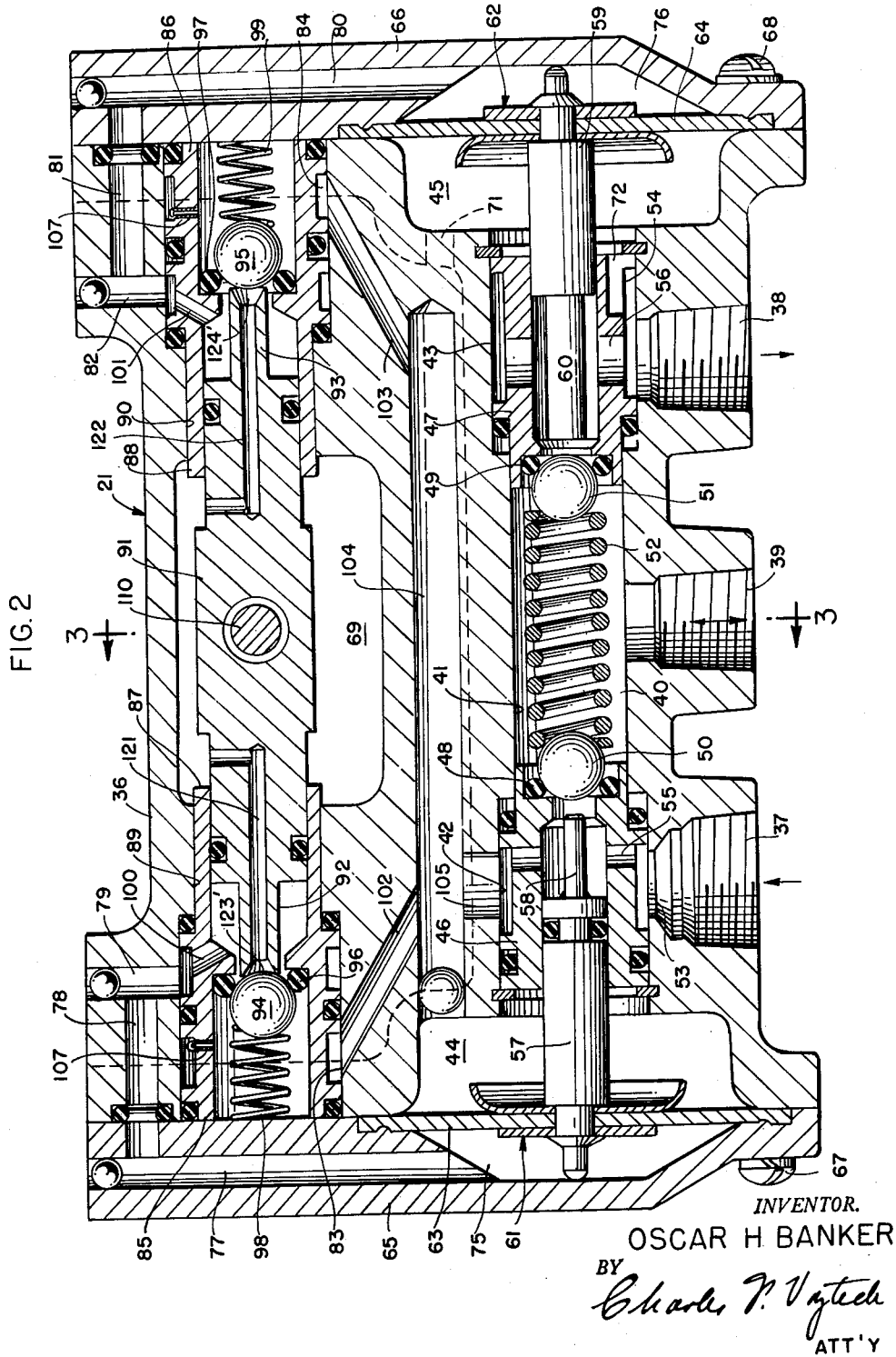

3,032,018
CONTROL VALVE FOR AIR SUSPENSION SYSTEM
Oscar H. Banker, Evanston, Ill., assignor, by mesne assignments, to Fawick Corporation, Cleveland, Ohio, a corporation of Michigan
Filed July 18, 1958, Ser. No. 749,474
9 Claims. (Cl. 121—46.5)

This invention relates to an air suspension system for motor vehicles and particularly to a control valve for use in such systems.

Torsion and leaf springs for supporting the chassis of motor vehicles are now being replaced by air-inflated bellows or bags generally made of reinforced elastomeric substances such as rubber. An air compressor is provided on each vehicle to supply compressed air to an accumulator from which the compressed air is conducted through suitable piping to a control valve which functions to admit air under pressure to inflate the bellows or bag or to bleed air therefrom. Normally, the air entrapped within the inflated bellows or bag serves as a spring or cushion which absorbs vibrations transmitted to it from the axles and unsprung weight or mass of the vehicle to the vehicle chassis. Due to the inherent flexibility of the system, however, it is possible, by controlling the amount of air entrapped in the bellows or bag, to elevate or lower the chassis with respect to the wheels of the vehicle and thereby compensate for variations in the load on the vehicle and also for variations in the load as between the individual wheels of the vehicle.

The above described air suspension system for vehicles have thus been utilized not only to take the place of metal springs, but also to maintain a predetermined spacial relationship between each wheel and the vehicle chassis so that the chassis may remain level regardless of shifts in the location of the load on a vehicle and also regardless of the variations in the weight of the load. These two functions are performed by a control valve which is the subject of this invention.

One of the problems inherent in the design of an air suspension control valve is in the differentiation by the valve between vibrations due to irregularities in the surface on which the vehicle is rolling on the one hand and on the other hand movements of the chassis with respect to the wheels due to changes in the location or amount, or both, of the load carried by the vehicle. Where attempts have been made in the past to solve this problem, the means used generally comprised a dash pot or some inertia device which remained relatively unaffected by rapid vibrations such as are produced by a bouncing wheel, but which caused an operation of the control valve whenever the control element of the valve was displaced either very slowly, or remained in displaced position for a predetermined length of time. These dash pot and inertia devices are costly and frequently erratic.

It is accordingly among the principal objects of this invention to provide a control valve for an air suspension system for a vehicle wherein simple and inexpensive means are provided for differentiating between rapid vibrations and slow movements of the vehicle chassis toward and away from the vehicle wheels or unsprung weight.

Another condition encountered in air suspension systems as heretofore constructed is that of leaking control valves which allow the air from one or more of the inflated bellows or bags to bleed therefrom while the vehicle is standing and the engine of the vehicle which operates the compressor is not operating. Thus, it may occur that the vehicle driver, upon returning to his vehicle after it had been standing idle for even a relatively short time finds that the vehicle is resting directly upon the wheel axles instead of being supported by the air springs inasmuch as the air springs have been completely bled of all air under pressure and have consequently collapsed.

It is another object of this invention to provide a control valve for an air suspension system for a vehicle wherein the valve is automatically locked in a position to close the outlet from its associated air spring (inflated bellows or bag) when the pressure in the accumulator for the system falls below a predetermined volume.

As a further object, this invention has within its purview the provision of a control valve for an air suspension system for a vehicle wherein the valve is sensitive to very small movements of its control element and is capable of admitting air into, or bleeding air from, an air spring very quickly without a wire-drawing effect.

Among the more general objects of this invention are the provision of a control valve for an air suspension system for a vehicle wherein the valve is not affected by temperature variations, is tamper proof, which has a control lever capable of being oscillated through a wide angle corresponding to full axle movement of the vehicle wheel axle for which it is designed without damage to the valve, and which is economical in its operation, particularly in that air leaving the air spring is confined within the system for re-use and any residual pressure in the air serves to reduce the load on the compressor.

These and other objects of this invention will become apparent from the following detailed description when taken together with the accompanying drawings in which, FIG. 1 is a schematic diagram of a complete air suspension system as applied to one of the air springs of a vehicle;

FIG. 2 is a cross-sectional plan view through the control valve for the system of FIG. 1 taken along the line 2—2 of FIG. 3, the valve being shown on a greatly enlarged scale;

FIG. 3 is a transverse section through the valve of FIG. 2 taken along line 3—3 thereof and in the direction of the arrows at the ends of said line;

FIG. 4 is a fragmentary side elevational view of the slip clutch for driving the control element of the valve;

FIG. 5 is a transverse section of one of the elements of the control valve of FIG. 3 prior to its assembly in said control valve; and FIG. 6 is a cross sectional view through a fragment of a modification of the valve of FIG. 2.

This invention will be described with reference to its application to a suspension system for a passenger automobile inasmuch as the requirements for such system are the most stringent in this field. Thus, the variety of terrain encountered, the high speeds at which the vehicles are driven, the degree of smoothness of ride demanded by the driver and passengers and the differences in driving ability as between the drivers thereof are all of the greatest magnitude in the passenger automobile field. It is understood, however, that the control valve and associated system of this invention may be used with equal facility for other vehicles wherein the chassis are supported from their respective wheels by resilient means.

Referring now to FIG. 1 for a general description of the system to which this invention may be applied, there is shown a fragment of a passenger vehicle chassis including the rear side frame element 10, a rear wheel axle 11 and its housing 12, and an axle support arm 13 pivoted at 14 to frame 10. The rear portion 15 of side frame member 10 is bent upwardly and is supported from the end 16 of arm 13 by an air spring assembly 17. Said assembly includes an air spring in the form of a bellows made from reinforced elastomeric material closed at its lower end 18 and having suitable means thereat by which said end may be rigidly secured to the rear end 16 of arm 13. The upper end 19 of the air spring 34 is appropriately secured to the rear portion 15 of side frame member 10 and additionally has an opening therethrough (not shown) by which air under pressure may be admitted to the air spring, or air may be vented therefrom to soften or collapse the spring.

The opening in the upper end 19 of the air spring 17 is connected by a conduit, shown schematically at 20, to the control valve 21, also shown schematically in rectangular outline, the latter being rigidly secured to the side frame member 10. A vent or exhaust line 22 connects valve 21 to a low pressure accumulator 23, and also through a branch 24, to the inlet side of an air compressor 25, the shaft 26 of which is preferably driven directly by the engine (not shown) of the vehicle. The outlet, or pressure side, of compressor 25 is connected through a conduit 27 to a conduit 28 which is in continuous communication at one end with a high pressure accumulator 29 and at its other end is connected to control valve 21.

Thus it may be apparent from the description thus far given that the entire air suspension system operates on a fixed quantity of air, with provision, of course, in the compressor for introducing makeup air to replace that which might be lost through leakage or to refill the system after a major repair thereof.

A conventional vehicle wheel 30 having mounted thereon a tire 31 are driven from axle 11 and serve to support the axle from the ground 32. Chassis frame member 10 is supported from axle 11 through housing 12, arm 13, the pivoted connection 14 with the frame 10, and air spring assembly 17. As irregularities in the surface of ground 32 are encountered by the tire 31, said tire and wheel, as well as the axle 11, housing 12 and arm 13, are made to follow the irregularity in the ground, but a similar movement of the chassis frame member 10 is either prevented entirely, or is materially reduced in magnitude, first by the pivotal movement of arm 13 around its support 14 and second, by the compression of the air in the air spring 17. Under ideal conditions air spring 34 should absorb all of the movement of the arm 13 so that frame 10 is undisturbed and continues in substantially a straight line. In actual practice, however, a very slight reaction may be felt in the frame member 10 as the spring 17 is vibrated.

The degree of inflation of air spring 17 determines the normal "at rest" elevation of the frame 10 above the axle 11. It is contemplated that for any given vehicle the most desirable elevation will be determined and that the inflation of the spring 17 will be regulated to maintain that desired elevation. For example, if the weight on chassis frame member 10 is increased, resulting in a tendency to lower the frame member with respect to the axle 11, the pressure of the air in the air spring 34 will be increased so that the extra weight is counteracted by increased pressure within the spring, thereby restoring the spring to its original size and the frame member 10 thus caused to assume its predetermined elevation above axle 11. Similarly, if the weight on frame member 10 is decreased so that the frame member 10 tends to rise above its predetermined elevation, the pressure in air spring 17 will be decreased to allow the frame member 10 to descend to its predetermined elevation. These increases or decreases in the pressure of the air in the air spring are controlled by control valve 21 which, in turn, is actuated by a link 33 and an arm 35, the link 33 being connected at its lower end to arm 13, and at its upper end to the free end of arm 35. Said arm 35 controls the valve element in valve 21 in a manner hereinafter to be described.

The construction of the valve 21 is shown more clearly in FIGS. 2, 3 and 4. Said valve is comprised of a valve body 36 having an inlet opening 37, a vent opening 38 and an outlet opening 39 which is connected to conduit 20 (FIG. 1) leading to the air spring 34. Outlet opening 39 is in continuous communication with a chamber 40 which may be in the form of a throughbore 41 having counterbores 42 and 43 formed in the ends thereof, said counterbores terminating in enlarged chambers 44 and 45 at opposite ends of located valve body 21. Within counterbores 42 and 43 are disposed sleeves 46, 47, the inner ends of which extend into throughbore 41 and on which are formed seats 48 and 49 for ball valves 50 and 51. Said seats may be made of an elastomeric material and in the form of endless rings having a circular radial cross section such as the well known O-rings, to simplify and render more economical the construction of the valves. Said balls 50 and 51 are held against their respective seats 48 and 49 by a single, common helical spring 52.

It may be observed from the description thus far given that when the pressure of the air in the conduit 20, valve outlet opening 39 and chamber 40 plus the pressure of spring 52 exceeds the pressure within the sleeves 46 and 47, balls 50 and 51 will remain seated on their seats 48 and 49 and hence will prevent bleeding of the air from the conduit 20 and its associated air spring 34 into the sleeves. They thus function as check valves under these conditions.

Sleeves 46 and 47 are formed with peripheral grooves 53, 54, respectively, which communicate with the interior of the sleeves through crossbores 55 and 56, respectively. Thus, when ball 50, for example, is unseated, air under pressure from inlet opening 37 may pass into groove 53 and through crossbore 55 to the interior thereof and thence around the ball 50 into chamber 40 whence it may then pass through outlet opening 39 into conduit 20 and the air spring 34. On the other hand when ball 51 is unseated, air from air spring 34 may pass through conduit 20 and the outlet passage 39 into chamber 40 and around valve 51 into the interior of sleeve 47 whence it may then pass through crossbores 56 and peripheral groove 54 into the vent opening 38 and through the vent or exhaust line 22 to the inlet of the pump 25 or the low pressure accumulator 23 as the case may be. The selective unseating of balls 50 and 51 thereby controls whether air under pressure will be admitted to air spring 34 to raise the chassis frame member 10 or air will be vented from air spring 34 to lower the chassis frame member 10.

The unseating of ball 50 is controlled by a plunger 57 slidable in sleeve 46 and having a pin 58 on the inner end thereof adapted to contact ball 50. Similarly, ball 51 may be unseated by a plunger 59 slidable in sleeve 47 and provided with a reduced diameter end or pin 60 which is adapted to contact ball 51.

The plungers 57, 59 are moved axially into contact with their respective balls 50 and 51 by pressure differential operated devices 61 and 62, respectively, which, in the form chosen to illustrate this invention, may be flexible diaphragms 63, 64 extending over the open ends of chambers 44 and 45, respectively, and held thereagainst by valve closure plates 65, 66, respectively. Said closure plates may be securely held against valve body 36 by machine screws 67, 68 or the like.

The pressure differential operated devices 61 and 62 are so constructed that when there is no differential pressure across the diaphragms 63 and 64, the ends 58 and 60 will be out of contact with their respective balls 50 and 51 and will be so held by the normal tension and stiffness of the material of which the diaphragms are made. Said diaphragms therefor may be made from reinforced elastomeric material to insure a location of the plungers 57 and 59 in a manner which will cause their pin ends 58 and 60, respectively, to be held out of contact with the balls 50 and 51 when there is no pressure differential across said diaphragms.

Chambers 44 and 45 are vented at all times to a hollow portion 69 of valve body 36, the vent for chamber 44 being shown at 70 in FIG. 3 and that for chamber 45 being shown in dotted lines at 71 in FIG. 2. Chamber 45 is in communication with vent opening 38 through a slot 72 formed in sleeve 47 communicating with peripheral groove 54 to prevent a build up of pressure in said hollow portion 69. It may be observed in FIG. 3 that the hollow region 69 is closed by a plate 73 sealed and secured to valve body 36 by machine screws 74. In this manner dust and dirt from the road is prevented from entering chambers 44 and 45 and the system to interfere ultimately with the operation of the pressure differential operated devices 61 and 62.

The exterior surfaces of diaphragms 63 and 64 serve as walls defining one side of chambers 75, 76 formed in the inner surfaces of closure plates 65 and 66, respectively, said chambers in turn being in communication through passageways 77, 78 and 79 on the one hand and 80, 81 and 82 on the other hand with counterbores 83 and 84, respectively, disposed above counterbore 41 as viewed in FIG. 2. Each counterbore is provided with a sleeve 85, 86 having a forward portion 87, 88, respectively, extending into throughbores 89 and 90.

The outer ends of the sleeves 85 and 86 are closed off by the closure plates 65 and 66, respectively. The inner ends 87, 88 of the sleeves are closed by the symmetrical ends of a pilot valve 91 which is axially slidable therein. Extending from the ends of the pilot valve 91 are pins 92 and 93 which are adapted to contact ball valves 94 and 95 cooperating with seats 96 and 97 respectively, in the sleeves 85 and 86. Said valves are retained on their seats by springs 98 and 99, respectively. Seats 96, 97 are similar in construction to seats 48 and 49.

Said ball valves 94 and 95 divide the interior of their respective sleeves into two chambers, the inner ones of which are in communication through suitable passages 100 and 101 with the passages 79 and 82 for conducting air under pressure to the chambers 75 and 76. The outer chambers in the sleeves 85 and 86 are in communication through passages 102, 103 with a common supply chamber 104 which, in turn, is in communication through a connecting passage 105 communicating through peripheral groove 53 with the inlet opening 37 leading to the source of air under pressure. Each of the inner chambers is vented through passages 121 and 122 in pilot valve 91 continuously open at their inner ends with vent chamber 69 and formed at their outer ends with seats 123', 124' engaged by balls 94, 95, respectively, when the pilot valve is moved to unseat the balls from seats 96, 97. In this manner passages 121 and 122 are closed to passages 100 and 101 leading to chambers 75 and 76 when it is desired to admit air under pressure thereto, and are instantly opened to vent passages 100 and 101 and the connected chambers 75 and 76 when the pilot valve 91 is moved away from balls 94 and 95.

Intermediate passages 102, 103 and the interior of sleeves 85 and 86, respectively, is a means for delaying the passage of the air under pressure through the sleeves to the interior thereof. This means is shown more clearly in FIG. 5 and is identical for both sleeves. FIG. 5 shows sleeve 85 in section and a peripheral groove 106 thereon communicating with passageway 102, said peripheral groove in turn having wound therearound a thin tubular member 107, one end of which extends into a crossbore 108 connecting the interior of the sleeve with the groove 106. The opposite end is wound around sleeve 85 in the groove 106 therein. The tubular member 107 is preferably sealed with respect to the exterior of the sleeve by soldering as at 109 so that the diameter of the crossbore 108 is that of the interior of the tubular member 107. Such thin tubular members are commercially available to provide internal diameters of one or two thousandths of an inch and also in various lengths. Thus, by selecting the appropriate diameter and length of tube 107, the impedance to the flow of air under pressure may be determined to give the desired action to the pressure differential operated devices 61 and 62.

The movement of pilot valve 91 toward ball 94 or ball 95 is controlled by a lever 110 (FIG. 3) which is mounted for rotation about a shaft 111 supported in valve housing 36 and having a splined end 112 extending to the exterior of the housing 36 and upon which lever 35 is mounted. Thus, as lever 35 is moved or oscillated about the axis of shaft 111 by link 33 as a result of relative movement between arm 13 and chassis member 10, shaft 111 is likewise oscillated.

Between shaft 111 and lever 110 is a slip clutch which is shown more clearly in FIG. 4. Said clutch is comprised of a driving sleeve 113 having rounded projections 114 extending axially into V-shaped recesses 115 in the hub 116 of the lever 110. A spring 117 compressed between a radial flange on sleeve 113 and an abutment 118 on shaft 111 serves to maintain the projections 114 in grooves 115. The free end 119 of lever 110 is ball-shaped and extends into an opening 120 in pilot valve 91.

As the shaft 111 is oscillated, the oscillatory movement is transmitted through the splined sleeve 113 and the slip clutch 114, 115 to the hub 116 of lever 110, and the latter then is oscillated about the axis of shaft 111, so that its ball end 119 imparts an axial movement to pilot valve 91. Excessive movement of the shaft 111 is not transmitted to the lever 110, since the projections 114 under these conditions will slip in their grooves 115 against the action of the spring 117 without turning lever 110. In this manner, damage to the pilot valve due to excessive movements of the arm 113 and its associated link 113 and arm 35 is prevented.

Due to the relatively small angle through which the arm 35 is oscillated, the sensitivity of the valve 91 must be relatively high. For this reason the ends 92 and 93 of the valve in one preferred embodiment are only about 0.005 of an inch short of touching their respective balls 94 and 95. The valve 91 is designed to remain in a neutral position, that is, a position in which it touches neither ball and is equally spaced from both balls, by determining the desired elevation of the chassis frame member 10 above the ground 32 and then adjusting the lever 35 on the splined end 112 of shaft 111 so that the neutral position of the valve 91 obtains under these conditions. Any movement of the arm 13 toward and away from the chassis frame member 10 therefore will be reflected in a movement of the valve member 91 toward one or the other of the balls 94, 95. It is assumed, of course, that under these conditions the pressure of the air in the spring 34 will be adequate to hold the chassis frame member 10 and arm 13 in the desired angular relationship. The movement of arm 13 will be transmitted through link 33, arm 35, shaft 111, slip clutch 114, 115 and lever 110 to valve 91 to move one or the other of the balls 94, 95 as aforesaid.

The operation of the valve is as follows:

Assume that compressor 25 is in operation and that ample air under pressure is available in the low and high pressure accumulators 23, 29 as well as in spring 34 so that the system is in equilibrium and valve 91 is in its neutral position. Assume next that the load on spring 34 is altered because a passenger has entered the vehicle, thereby increasing the load on spring 34. The equilibrium of the system will be upset since the air in spring 34 will be compressed and spring 34 correspondingly collapsed. The collapse of spring 34 will be accompanied by a lowering of chassis frame member 10 toward arm 13 and a movement of arm 35 in a counterclockwise direction as viewed in FIG. 5. Such movement of arm 35 will result in a movement of pilot valve 91 to the left as viewed in FIG. 2 to unseat ball 94. This in turn opens the passages leading to chamber 75 to the high pressure air supply passage 102.

In order for air from passage 102 to enter passages 77, 78 and 79 leading to chamber 75 it must first pass through thin tube 107 which, as stated previously, has a very small opening therein and hence a finite time will be required to pass sufficient air therethrough to build up pressure in that chamber. In one typical embodiment a delay of three seconds was effected and found to be satisfactory. While pressure is building up in chamber 75, plunger 57 will be moving toward and then resting against ball 50, and when sufficient pressure is built up to overcome the force of spring 52 and the pressure of the air in spring 34, ball 50 will be unseated by end 58 of plunger 57 to admit air to the interior of bore 41 and out through opening 39 to conduit 20 and the air spring 34. As air is admitted to spring 34, it will expand and raise the chassis with respect to axle 11, and thus in turn will have the effect of rotating lever 35 in a clockwise direction as viewed in FIG. 1 and the ultimate effect of shifting pilot valve 91 away from ball 94. Said ball 94 will thereupon seat on seat 96 and close passage 100 to the air under pressure, and with pin 92 withdrawn from ball 94, vent passage 121 is opened and immediately vents passage 100 and its connected chamber 75. The resilience in diaphragm 63 withdraws plunger 57 from ball 50 and spring 52 seats ball 50 on its seat 48 to cut off further supply of air under pressure to outlet opening 39. Air spring 34 thus ceases to expand and such air as is entrained therein and in conduit 20 remains locked therein by ball 50.

Attention is directed to the fact that the amount of compression of spring 34 is immaterial to a complete opening of outlet opening 39 to the air inlet opening at ball 50. For example, assuming that the change in load is slight and ball 94 is just barely "cracked" off its seat 96, nevertheless as long as air can pass through the seat, it will continue to do so until a full and complete operation of pressure differential device 61 is effected and ball 50 is moved completely off its seat to admit air to outlet passage 39.

When the load on chassis 10 is lightened, as by a passenger getting off the vehicle, the spring 34 will expand and raise the chassis with respect to axle 11 to cause a clockwise movement of lever 35 as received in FIG. 1 which results in a movement of pilot valve 91 to the right in FIG. 2, vent passage 122 is first closed by ball 95 and then ball 95 is raised off its seat to allow air under pressure to enter passage 101 and the connecting passages to chamber 76. Here again, a time delay is effected by the thin tube interposed between passage 103 and the interior of sleeve 86 so that the build-up of pressure in chamber 76 is slowed up. After the passage of the prescribed time plunger 59 is moved to the left as viewed in FIG. 2 to unseat ball 51 and open outlet 39 and the conduit 20 from spring 34 to the vent opening 38. Spring 34 will thereupon commence to collapse and allow chassis 10 to lower, thus causing arm 35 and its associated valve 91 to move in a reverse direction to seat ball 95 and open chamber 76 to vent passage 122 through the connected passages. Pressure differential device 62 returns to its neutral position because of the resilience in diaphragm 64, thereby withdrawing plunger 59 from ball 51 and the latter then closing outlet opening 39 to the vent opening 38.

It may be apparent that because of the time delay introduced into the system by the tubes 107, when the vehicle is travelling on a bumpy road so that the axles bounce, pilot valve 91 does not remain in one or the other of its extreme positions long enough to allow pressure to build up in the chambers 75 or 76, and hence the quantity of air in spring 34 remains unchanged. It is contemplated that the strength of spring 52 is sufficiently high to prevent an operation of the pressure differential operated devices 61, 62 to unseat balls 50 or 51 when the pressure of the air in high pressure tank 29 falls below a predetermined minimum value. The pressure of the air in the system and the force of spring 52 hold the balls 50 and 51 against their seats so that should the supply of air under pressure be lost for any reason whatever, the air in the springs 34 is locked therein and remains so until a supply of air is again available.

A somewhat simpler construction of flow control for the air through the valve is shown in FIG. 6. Instead of using one tube 107 for each valve 94, 95, the FIG. 6 form uses a single tube located between ball 50 and the common air inlet passage 104 from which the air is conducted by passages 102, 103 to each of the valves 94, 95.

In the FIG. 6 form, the valve body is modified in a transverse plane approximately intersecting the axis of inlet opening 37, to incorporate an angularly disposed cylindrical boss the axis of which intersects the common inlet passage 104. A blind hole 124 is drilled into boss 123 coaxially therewith to intersect passage 104 and to extend beyond said passage into the body of the valve. A counterbore 125 is drilled into hole 124 to form a shoulder 126 in which is received an O ring seal 127. A second counterbore 128 intersects counterbore 42 and is internally threaded to receive a screw plug 129. The opening formed by counterbores 125, 128 and the hole 124 takes the place of the connecting passage 105 of FIG. 2 which is therefore eliminated in the FIG. 6 form.

Extending into hole 124 is a flanged tubular fitting 130, the flange of which is seated against O ring 127 to seal the exterior of the fitting from hole 124. Into the interior of the fitting 130 is inserted one end of a tube 131, the other end of which extends into hole 124 with considerable clearance. Tube 131 is substantially identical in internal diameter and length with tube 107, but is made straight. Tube 131 is soldered or otherwise fixed and sealed to fitting 130. Press fitted upon the free end of fitting 130 and upon an appropriate projection 132 on plug 129 is a tubular filter element 133 the outside diameter of which is small enough to enable it to fit into counterbore 125 so that ample space is provided between the exterior of filter element 133 and the counterbore 128 to allow air from counterbore 42 to pass freely around and through the element into fitting 130 and tube 131.

Plug 129, filter 133, fitting 130 and tube 131 constitute a unit which is readily removable from the valve boss 123 for inspection and replacement of filter or tube, or to insert a tube producing a different delay time. Furthermore, it may be noted that since the hole 124 and counterbores 125, 128 are sealed from outlet opening 39 by ball check valve 50, the tube and plug may be removed without depleting the air in the associated air spring 34.

It is understood that the foregoing description is merely illustrative of a preferred embodiment of the invention and that the scope of the invention is not to be limited thereto but is to be determined by the appended claims.

I claim:

1. In combination a valve body having intercommunicating inlet, outlet and exhaust openings, said inlet opening being in communication with a source of fluid under pressure, a first valve means interposed between the inlet and outlet openings, a second valve means interposed between the outlet and exhaust openings, pressure differential operated means for operating both said valve means, said pressure differential operated means having a normally inoperative position, a third valve means interposed between the inlet opening and the pressure differential operated means for admitting fluid under pressure to the pressure differential operated means to operate the latter, and means for restricting the passage of fluid under pressure from the inlet opening to the pressure differential operated means to delay the operation of said pressure differential operated means.

2. The combination described in claim 1, said means for restricting the passage of fluid under pressure comprising a tube of predetermined length and diameter interposed in the path of the fluid flowing to the pressure differential operated means.

3. The combination described in claim 1, said means for restricting the passage of fluid comprising a valve member removable from the exterior of the valve body.

4. The combination described in claim 1, said valve body having an opening to the exterior of the valve body communicating with the inlet opening and said combination including a fluid filtering device, and a common support for the filtering device and the means for restricting the passage of fluid under pressure, said common support being disposed in the opening communicating with the exterior and removable from the exterior of the valve body.

5. The combination described in claim 1, said valve body having an opening to the exterior thereof and communicating with said inlet opening, and means in said opening communicating with the exterior and removable from the exterior of the valve body for filtering the fluid passing to the pressure differential operated means.

6. In combination, a valve body having a throughbore, sleeves at the end regions of the throughbore, said sleeves having valve seats on the interior thereof, valves cooperating with the seats to close the interior of the sleeves, a plunger in each sleeve and adapted to contact a valve to remove said valve from its seat, a vent passage through the plungers and terminating in a seat in the plungers adjacent to and adapted to be contacted by the valves to close said vent passage when the plungers are in contact with the valves to remove said valves from their first mentioned seats, means for introducing air under pressure to one side of the valves, a pressure differential operated motor in communication with the other side of each valve, said motors being vented when the seats on the plunger are removed from the valves and communicating with the air under pressure when the plungers contact the valves and remove said valves from the seats on the sleeve, and additional valve means operated by the said pressure differential operated motors.

7. A valve as described in claim 6, said means for introducing air under pressure through the sleeve comprising a fine tube having one end sealed with respect to the sleeve, and the other end bent around the sleeve, said tube providing a restriction in the path of the air to the valve the magnitude of which varies as a function of the length of the tube.

8. A valve for controlling the passage of air under pressure to and from an air spring or the like, said valve comprising a valve body having a pair of throughbores therein, axially spaced high pressure air inlet and vent passages communicating with one of said throughbores, an outlet passage communicating with said one bore intermediate the inlet and vent passages, sleeves in the said one bore interposed between the bore and the inlet and vent passages, valve seats on the adjacent ends of the sleeves, ball valves on the seats closing the outlet passage to the inlet and vent passages, resilient means holding the ball valves on their seats, plungers in the sleeves and adapted to move the balls off their seats against the spring pressure, pressure differential operated means in contact with the plungers for urging the plungers against the balls to unseat said balls, and valve means in the other throughbore for controlling the admission of pressure fluid to the pressure differential operated means, said valve body having passages therein for conducting air under pressure to the valves in the second throughbore and for conducting air under pressure to the pressure differential operated means from the valves in the second throughbore.

9. A valve as described in claim 8, and fine tubes in the passages leading to the pressure differential operated means and interposing a restriction in the passages to delay the operation of the pressure differential operated means to move the balls off their seats.

References Cited in the file of this patent

UNITED STATES PATENTS

| | | |
|---|---|---|
| 2,361,575 | Thompson | Oct. 31, 1944 |
| 2,670,201 | Rossman | Feb. 23, 1954 |
| 2,878,832 | Hoge | Mar. 24, 1959 |
| 2,881,799 | Menewisch | Apr. 14, 1959 |
| 2,902,052 | Ohlsson | Sept. 1, 1959 |
| 2,912,009 | Cooksley | Nov. 10, 1959 |